Nov. 10, 1936.  G. W. JOHNSON  2,060,322

POWER TRANSMISSION MECHANISM

Filed March 29, 1934

INVENTOR
GEORGE W. JOHNSON
BY
Brockett, Hyde, Higley & Meyer
ATTORNEYS

Patented Nov. 10, 1936

2,060,322

UNITED STATES PATENT OFFICE 2,060,322

POWER TRANSMISSION MECHANISM

George W. Johnson, Cincinnati, Ohio, assignor, by mesne assignments, to Allis-Chalmers Manufacturing Company, Milwaukee, Wis., a corporation of Delaware Application March 29, 1934, Serial No. 717,986

6 Claims. (Cl. 74—229)

This invention relates to power transmission mechanism and particularly to a belt drive.

An object of the invention is to provide an improved drive for efficiently mitigating the shock transmitted to a driven member by sudden variations in the speed of a driving member.

Another object of the invention is to provide by a simple construction means for automatically varying the frictionally engaged driving area between a belt and pulley according to the driving torque exerted.

Figure 1:
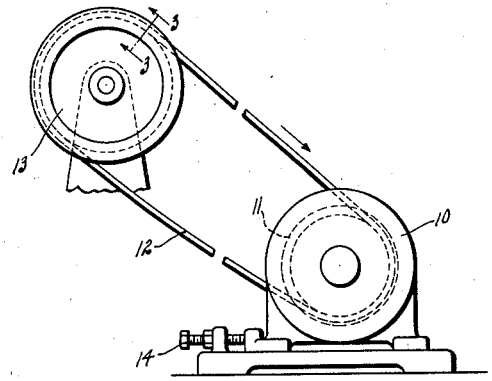
Figure 2:
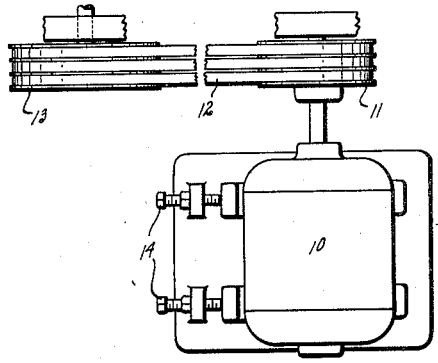
Figure 3:
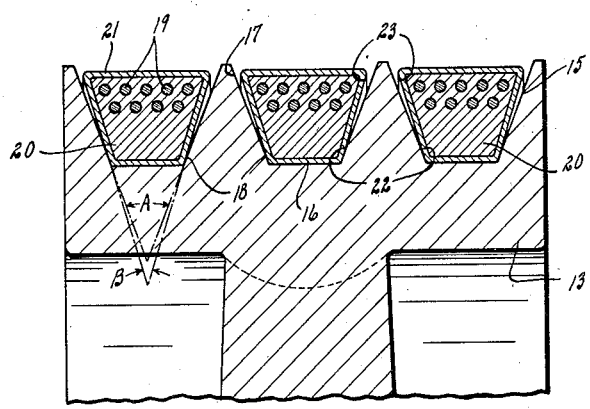
Figure 5:
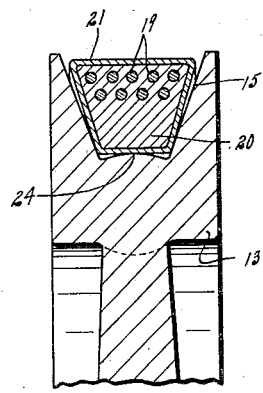
Figure 4:
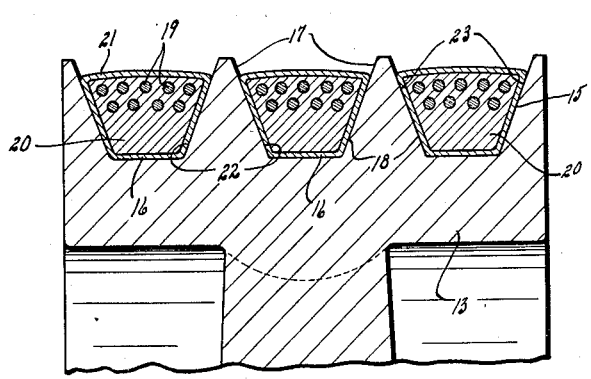
Figure 6:
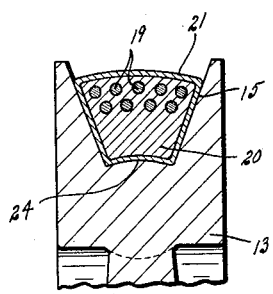

One embodiment of my invention is illustrated in the drawing, in which Fig. 1 is an elevation and Fig. 2 is a plan view of a general arrangement of a belt drive, Fig. 3 is a section along the line 3—3 of Fig. 1 with the parts idle, Fig. 4 is a section similar to Fig. 3 with the parts exerting a relative driving torque, Fig. 5 is a sectional view of a modification with the parts idle; while Fig. 6 is the section of Fig. 5 with the parts exerting a relative driving torque.

Belt drives are advantageous where an exact relation between the speed of the driving and driven member is not required and where it is desirable to lessen the shock to the driven parts which may be caused by sudden variations in the speed of the driving member. Belt drives are arranged with sufficient frictionally engaged area between the belt and its coacting pulley to transmit the desired driving effect under full load conditions. Such a large engaged area is not required at lighter loads and various disadvantages result from such an arrangement, as for instance, greater frictional load than is necessary at lower power demands and sudden jerks at lower power outputs because the large areas frictionally engaged at such outputs constitute practically a positive drive.

To overcome these disadvantages I have combined a belt and pulley with their coacting driving surfaces so constructed and arranged that increased driving effect upon the belt increases the frictionally engaged area of the coacting surfaces. This construction comprises a pulley, having about its periphery an annular groove wider at a radially outward portion than at a radially inward portion, and a belt, elastic transversely of its length, and adapted to lie within and to contact the side walls of the groove, the belt, when passing about the pulley, having radially inward and outward portions adapted to drivingly coact with like portions of the pulley groove, the width of the inward portion of the belt being substantially equal to the width of the inward portion of the groove, and the width of the outward portion of the belt, when idle, being less than the width of the outward portion of the groove. It results from this construction that a driving pull upon the belt causes a lateral expansion of the radially outward portion of the belt which causes the side walls of the belt to engage the side walls of the groove, and the greater the driving effect, the greater will be the frictionally engaged driving area.

A conventional drive is illustrated in Figs. 1 and 2 comprising a motor 10 driving a pulley 11, which transmits power by means of belts 12 to a driven pulley 13. The drive is in the direction of the arrow of Fig. 1 and the slack, if any, will be in the lower run of the belts. To adjust the tension of the driving belts, and to take up for wear, the motor may be adjustable toward and away from the driven pulley, as by means of screws 14. My improved drive is suitable for general application, but it is particularly advantageous in short-center drives. The drive is equally effective whether applied to plural groove sheaves, as shown in Figs. 1 to 4, or to a single groove sheave, as shown in Figs. 5 and 6.

The pulley 11 or 13, or both, may be provided with annular wedge-shape grooves about its periphery, each groove having side walls extending radially inwardly and inclined toward each other. Preferably the grooves are of truncated V-shape having inclined side walls 15 and a bottom 16. The groove walls have radially outward portions 17 and radially inward portions 18.

The belt may be of any construction which permits elastic deformation laterally. In the form shown cords 19 are moulded in a rubber body 20, which is encased in a wear-resisting cover 21. The belt is so shaped that it has radially inward and outward portions adapted to coact in definite relation with similar portions of the pulley groove. The radially inward portion 22 of the belt is substantially equal in width to the radially inward portion of the groove, but the radially outward portion 23 of the belt is of less width than the outward portion of the groove when the belt is idle, which is the position illustrated in Fig. 3. With a driving pull exerted on the belt, the elasticity of the belt in a lateral direction permits the side walls of the belt to be expanded toward the groove walls so that the greater the pull on the belt, the greater is the frictional area engaged.

The belt illustrated is trapezoidal in section but other arrangements which produce like results in a similar manner are within the scope of my invention. To coact with the belt shown, the pulley groove is preferably of truncated V-shape, and the bottom of the groove substantially corresponds in width to the bottom or narrower parallel face of the trapezoidal section. The dimension across the upper face of the belt is less than the width of the groove at that point so that the belt contacts substantially the bottom only of the groove when the belt is idle or under practically no load. The included angle A between the sides of the V-groove is greater than the included angle B between the sloping sides of the trapezoidal section when the belt is under little or no tension. When a driving pull is exerted on the belt more and more of the side wall surfaces of the belt come in contact with the side walls of the groove as the load increases, until at full load the respective side walls are in full contact. The drawing is somewhat exaggerated. In practice the clearance between the side surfaces of the belt and groove would not be as great as that illustrated in Figs. 3 and 5.

In an installation like that of Figs. 1 to 4, if the various belts are constructed or chosen to have equal elastic properties, the driving pull will be distributed equally among the various belts, each of which will adjust itself in its groove to engage substantially equal frictional driving areas.

In the modification of Figs. 5 and 6 the central portion of the bottom of the groove is raised to enhance the tendency of the belt to expand laterally under belt tension. In the form shown the raised portion is provided by slightly crowning the bottom of the groove as at 24. Otherwise the modification operates like the device of Figs. 3 and 4.

What I claim is:

1. Power transmission mechanism comprising in combination, a pulley having a peripheral wedge-shape groove, the side walls of said groove extending inwardly at an angle toward each other, said groove having a bottom wall between said side walls, an elastic belt wedge-shape in section lying in said groove and contacting said bottom wall, the inclined faces of said belt coacting with the side walls of the groove at their innermost point of contact and the angle between the side walls of the groove being greater than the angle included between the inclined faces of the belt when the belt is in a substantially untensioned state.

2. Power transmission mechanism comprising in combination, a pulley having a peripheral wedge-shape groove, the side walls of said groove extending inwardly at an angle toward each other, an elastic belt wedge-shape in section contacting the bottom of said groove, the inclined faces of said belt coacting with the side walls of the groove at their innermost point of contact and the angle between the side walls of the groove being greater than the angle included between the inclined faces of the belt when the belt is in a substantially untensioned state.

3. Power transmission mechanism comprising in combination, a pulley having an annular truncated V-groove about its periphery, a laterally elastic belt trapezoidal in section adapted to coact with said groove and at all times contacting the bottom of said groove, the width of said belt at the narrower of its parallel faces being substantially the width of the bottom of said groove, and the included angle between the sides of the truncated V-groove being greater than the included angle between the sides of the trapezoid when the belt is in a substantially untensioned state.

4. Power transmission mechanism comprising in combination, a pulley having an annular truncated V-groove about its periphery, an elastic belt trapezoidal in section and adapted to coact with said groove and at all times contacting the bottom of said groove, the width of the belt at the narrower of its parallel faces being substantially equal to the width of the bottom of said groove, the included angle between the sides of the groove being greater than the included angle between the sides of the trapezoid when the belt is in a substantially untensioned state, and the mid-portion of the bottom of said groove extending radially outward.

5. Power transmission mechanism comprising in combination, a pulley having an annular truncated V-groove about its periphery, an elastic belt trapezoidal in section and adapted to coact with said groove and at all times contacting the bottom of said groove, the width of the belt at the narrower of its parallel faces being substantially equal to the width of the bottom of said groove, the included angle between the sides of the groove being greater than the included angle between the sides of the trapezoid when the belt is in a substantially untensioned state, and the bottom surface of said groove being crowned.

6. Power transmission mechanism comprising in combination, a pulley having a peripheral wedge-shape groove, the side walls of said groove extending inwardly at an angle toward each other, a belt wedge shape in section lying in said groove, the inclined faces of said belt coacting with the side walls of the groove at their innermost point of contact and the angle between the side walls of the groove being greater than the angle included between the inclined faces of the belt when the belt is in a substantially untensioned state, and said belt when subjected to tension being elastically expansible transversely of its length, in a manner to cause the side walls thereof to engage a greater area of the side walls of said groove.

GEORGE W. JOHNSON.